(12) United States Patent
Qian

(10) Patent No.: US 11,364,637 B2
(45) Date of Patent: *Jun. 21, 2022

(54) INTELLIGENT OBJECT TRACKING

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

(*) Notice: Subject to any disclaimer, the term of this patent is extended or adjusted under 35 U.S.C. 154(b) by 13 days.

This patent is subject to a terminal disclaimer.

(21) Appl. No.: 16/897,850

(22) Filed: Jun. 10, 2020

(65) Prior Publication Data
US 2020/0298413 A1 Sep. 24, 2020

Related U.S. Application Data

(63) Continuation-in-part of application No. 16/813,439, filed on Mar. 9, 2020, now abandoned, which is a
(Continued)

(51) Int. Cl.
*B25J 9/16* (2006.01)
*B25J 19/02* (2006.01)
(Continued)

(52) U.S. Cl.
CPC .......... *B25J 9/1697* (2013.01); *B25J 19/023* (2013.01); *G05D 1/0234* (2013.01); *B25J 11/0045* (2013.01); *G05D 2201/0216* (2013.01)

(58) Field of Classification Search
CPC .. B25J 11/0005; B25J 11/0045; B25J 19/023; B25J 9/1697; G05B 2219/37563;
(Continued)

(56) References Cited

U.S. PATENT DOCUMENTS 5,227,985 A * 7/1993 DeMenthon ............ G01S 5/163
345/158
10,587,813 B2 * 3/2020 Qian .................... F16M 11/041
(Continued)

FOREIGN PATENT DOCUMENTS

EP 1006386 A1 6/2000
JP 2000165850 A 6/2000
(Continued)

OTHER PUBLICATIONS

Office Action issued in corresponding JP Application No. 2020-505399 dated Aug. 25, 2020 (4 pages).
(Continued)

*Primary Examiner* — Farzana Hossain
(74) *Attorney, Agent, or Firm* — Osha Bergman Watanabe & Burton LLP

(57) ABSTRACT

A method for object tracking. The method includes capturing, using a camera device, a sequence of images of a scene, detecting, based on a pattern of local light change across the sequence of images, a light source in the scene, comparing, in response to detecting the light source, a location of the light source in at least one image of the sequence of images and a current position of a transport robot to generate a result, and generating, based on the result, a control signal for moving the transport robot toward the light source such that the light source aligns with a target position within the field-of-view.

20 Claims, 13 Drawing Sheets

Related U.S. Application Data continuation-in-part of application No. 16/025,761, filed on Jul. 2, 2018, now Pat. No. 1,058,713, which is a continuation of application No. PCT/CN2017/093439, filed on Jul. 18, 2017.

(51) Int. Cl.
*G05D 1/02* (2020.01)
*B25J 11/00* (2006.01)

(58) Field of Classification Search
CPC ........... G05B 2219/37572; G05B 2219/40554; G05D 1/0234; G05D 2201/0216
See application file for complete search history.

(56) References Cited

U.S. PATENT DOCUMENTS

| | | | |
|---|---|---|---|
| 11,122,210 B2* | 9/2021 | Qian | G03B 17/561 |
| 2004/0070565 A1* | 4/2004 | Nayar | G06T 15/506 |
| | | | 345/156 |
| 2010/0020244 A1 | 1/2010 | Mitsuya et al. | |
| 2012/0194644 A1 | 8/2012 | Newcombe et al. | |
| 2013/0120636 A1* | 5/2013 | Baer | G03B 15/05 |
| | | | 348/335 |
| 2015/0049211 A1* | 2/2015 | Lim | H04N 5/2258 |
| | | | 348/211.1 |
| 2015/0206012 A1 | 7/2015 | Stout et al. | |
| 2018/0007331 A1* | 1/2018 | Levcovich | G08B 13/19617 |
| 2018/0288295 A1* | 10/2018 | Scepanovic | G03B 15/05 |
| 2019/0101377 A1* | 4/2019 | White | H04N 5/33 |

FOREIGN PATENT DOCUMENTS

| | | |
|---|---|---|
| JP | 2001305645 A | 11/2001 |
| JP | 2004101616 A | 4/2004 |
| JP | 2009128795 A | 6/2009 |
| JP | 2016178608 A | 10/2016 |
| JP | 2017112504 A | 6/2017 |

OTHER PUBLICATIONS

Extended European Search Report issued in corresponding EP Application No. 17918498.1 dated Jan. 28, 2021 (7 pages).

* cited by examiner

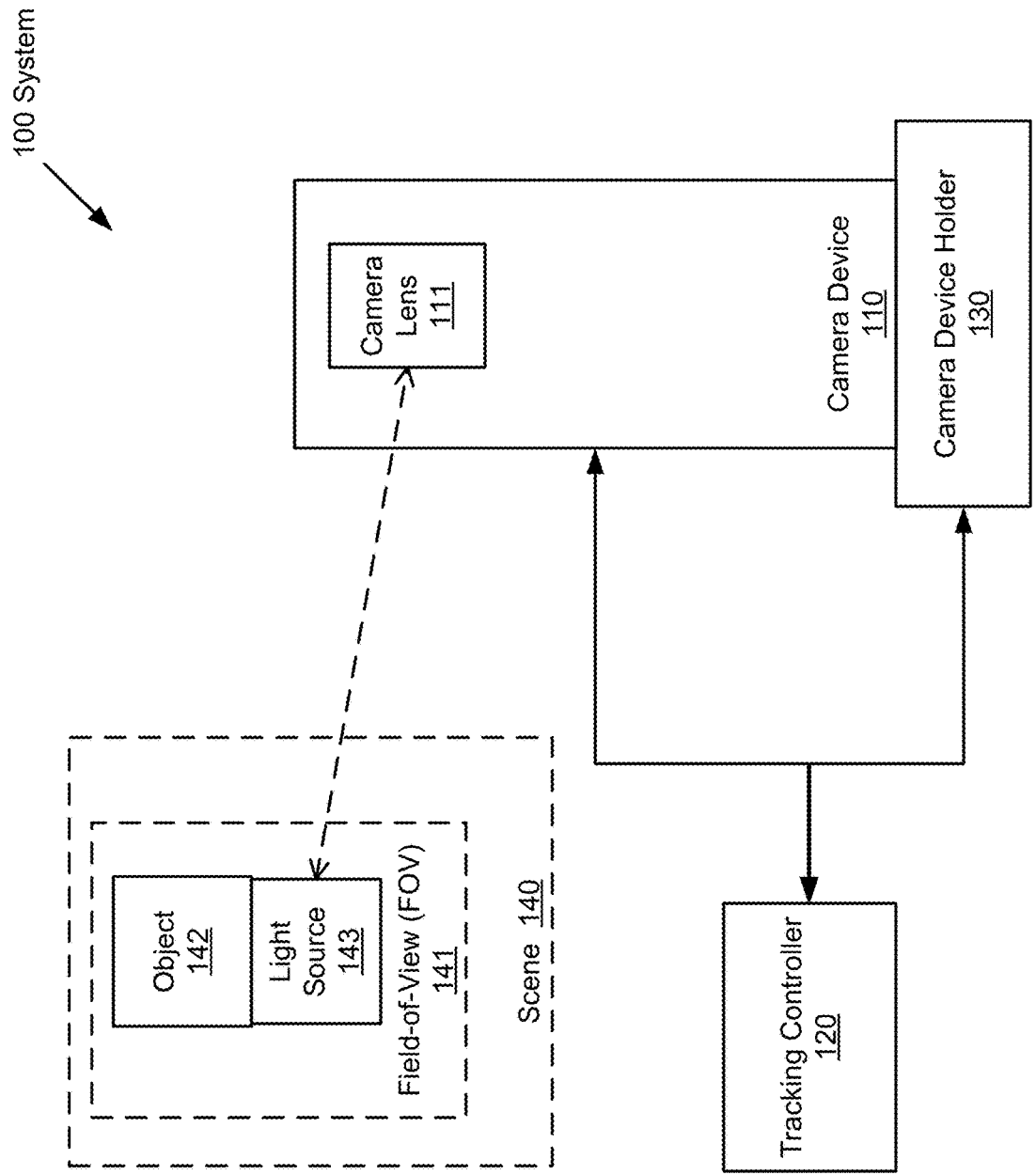
FIG. 1.1

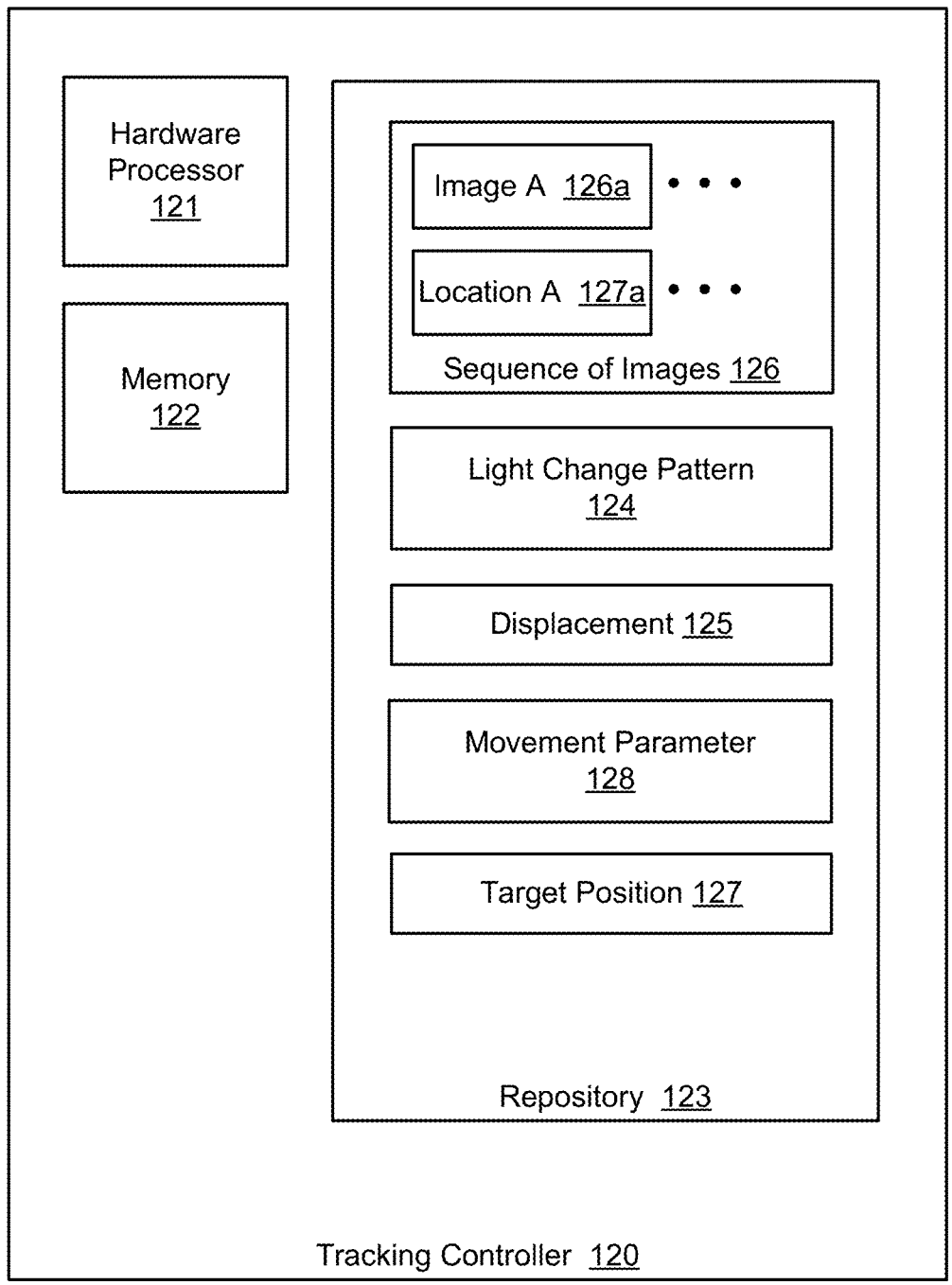
FIG. 1.2

INTELLIGENT OBJECT TRACKING

CROSS REFERENCE TO RELATED APPLICATIONS

This application is a continuation-in-part application of U.S. patent application Ser. No. 16/813,439, filed on Mar. 9, 2020, which is a continuation-in-part application of U.S. patent application Ser. No. 16/025,761, filed on Jul. 2, 2018, which is a continuation application of International Application PCT/CN2017/093439 filed on Jul. 18, 2017. The entire contents of these applications are incorporated herein by reference.

BACKGROUND

A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera.

SUMMARY

In general, in one aspect, the invention relates to a method for object tracking. The method includes capturing, using a camera device, a sequence of images of a scene, detecting, based on a pattern of local light change across the sequence of images, a light source in the scene, comparing, in response to detecting the light source, a location of the light source in at least one image of the sequence of images and a target position within the at least one image to generate a result, and generating, based on the result, a control signal for changing a field-of-view of the camera device such that the light source substantially aligns with the target position within the field-of-view.

In general, in one aspect, the invention relates to a tracking controller for a camera device. The tracking controller includes a computer processor and memory storing instructions. The instructions, when executed, cause the computer processor to obtain a sequence of images of a scene, wherein the sequence of images is captured by the camera device, detect, based on a pattern of local light change across a sequence of images, a light source in the scene, compare, in response to detecting the light source, a location of the light source in at least one image of the sequence of images and a target position within the at least one image to generate a result, and generate, based on the result, a control signal for changing a field-of-view of the camera device such that the light source substantially aligns with the target position within the field-of-view.

In general, in one aspect, the invention relates to a non-transitory computer readable medium storing instructions for object tracking. The instructions, when executed by a computer processor, include functionality for obtaining a sequence of images of a scene, wherein the sequence of images is captured by a camera device, detecting, based on a pattern of local light change across the sequence of images, a light source in the scene, comparing, in response to detecting the light source, a location of the light source in at least one image of the sequence of images and a target position within the at least one image to generate a result, and generating, based on the result, a control signal for changing a field-of-view of the camera device such that the light source substantially aligns with the target position within the field-of-view.

Other aspects of the invention will be apparent from the following description and the appended claims.

BRIEF DESCRIPTION OF DRAWINGS

FIGS. 1.1 and 1.2 show a schematic block diagram of a system in accordance with one or more embodiments of the invention.

DETAILED DESCRIPTION

Figure 2:
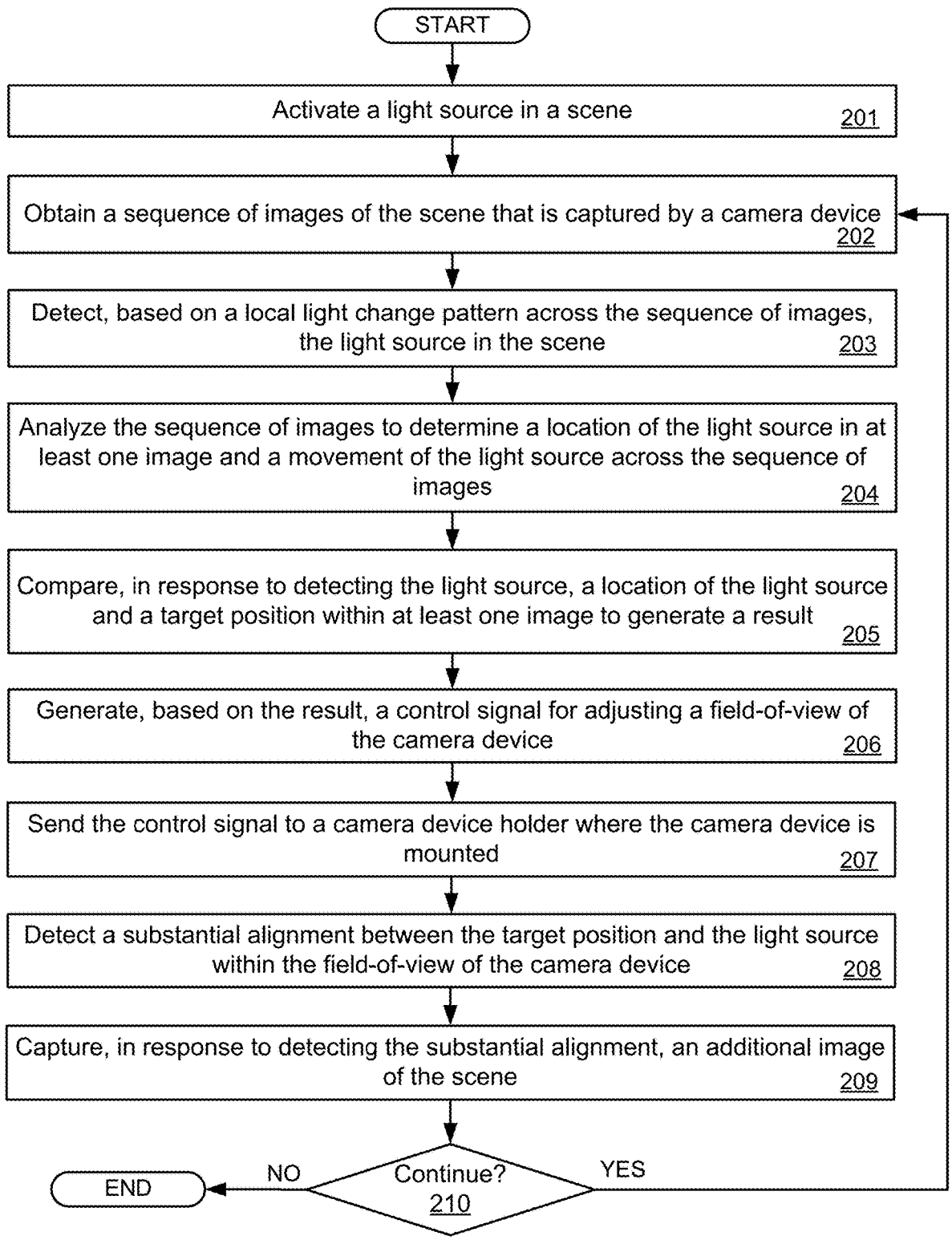
FIG. 2 shows a method flowchart in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for tracking an object in a field-of-view (FOV) of a camera device. In one or more embodiments of the invention, a light source is attached to the object while a sequence of images are captured using the camera device. In one or more embodiments, the light source emits a strobe light that changes light intensity and/or color from time to time. Based on a pattern of local light change across the sequence of images, the light source is detected in the FOV. In response to detecting the light source, a location of the light source and a target position within an image are compared to generate a result, such as a displacement or a movement parameter. Accordingly, a control signal is generated based on the result to control a camera device holder. Specifically, the camera device holder adjusts the FOV based on the control signal such that the light source substantially aligns with the target position within the FOV. In one or more embodiments, the sequence of images is part of a video recording and the control signal causes the object to appear at the target position within the FOV in the video recording.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having a camera lens (111), a tracking controller (120), a camera device holder (130), a scene (140), a field-of-view (FOV) (141) of the camera lens (111), an object (142) appearing within the FOV (141), and a light source (143) attached to the object (142). Further, the camera device (110), tracking controller (120), and camera device holder (130) are communicatively coupled to each other. In one or more embodiments of the invention, two or more of the camera device (110), tracking controller (120), and camera device holder (130) are integrated into a single device. For example, at least a portion of the tracking controller (120) may be included in the camera device (110). In another example, at least a portion of the tracking controller (120) may be included in the camera device holder (130). In still another example, one part of the tracking controller (120) is included in the camera device (110) while another part of the tracking controller (120) is included in the camera device holder (130).

In one or more embodiments of the invention, the light source (143) is any device that emits light. In one or more embodiments, the light source (143) includes a light-emitting-diode (LED). In one or more embodiments, the light source (143) emits a strobe light, which changes intensity and/or color from time to time. For example, the strobe light may emit a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or color change in the light. In one or more embodiments, the light source (143) emits a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light source (143) emits a light change pattern that is synchronized with the frame rate of the camera device (110).

In one or more embodiments of the invention, the camera device (110) is a device with a camera lens (e.g., camera lens (111)) and associated components for taking photographs and/or video recordings. A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111) may be on the front surface or back surface of the smart phone. In one or more embodiments, the camera device (110) includes a timer to control the frame rate of image capture based on the duty cycle and/or repetition rate of the light source (143).

In one or more embodiments, the scene (140) is a place where an action or event, imaged by the camera device (110), occurs. The field-of-view (FOV) (141) is an extent of the scene (140) that is imaged by the camera device (110) using the camera lens (111). In other words, an object inside the FOV (141) will appear in an image captured and/or outputted by the camera device (110). For example, the FOV (141) may correspond to a solid angle within which the camera lens (111) projects light input to an associated optical sensor (not shown) of the camera device (110). In one or more embodiments, the FOV (141) corresponds to different portions of the scene (140) according to how the camera lens (111) is oriented toward, zoomed with respect to, or otherwise positioned relative to, the scene (140). In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 7A and 7B below.

In one or more embodiments of the invention, the camera device holder (130) is configured to mechanically hold the camera device (110) and to adjust, in response to a control signal from the tracking controller (120), the FOV (141) of the camera lens (111). For example, the camera device holder (130) may include a motorized tilt and swivel device for adjusting a camera angle of the camera lens (111). In another example, the camera device holder (130) may include a motorized horizontal and vertical sliding device for adjusting a position of the camera lens (111) relative to the scene (140). The sliding device may include a mechanical stage for holding and moving the camera device (110). Examples of the camera device holder (130) are described in reference to FIGS. 3A and 3B below.

In one or more embodiments, the tracking controller (120) includes a hardware component, a software component, or a combination thereof that is configured to adjust the FOV (141) of the camera lens (111). For example, the tracking controller (120) may control the FOV (141) by way of controlling the camera device holder (130). In another example, the tracking controller (120) may further control the FOV (141) by way of controlling a zoom level of the camera lens (111). In one or more embodiments, the tracking controller (120) controls the FOV (141) such that the object (142) appears in a target position within the FOV (141). In one or more embodiments, the tracking controller (120) controls the FOV (141) using the method described in reference to FIG. 2 below. In one or more embodiments, the tracking controller (120) include the components described in reference to FIG. 1.2 below.

FIG. 1.2 shows details of the tracking controller (120) in accordance with one or more embodiments. The following description of FIG. 1.2 refers to various components depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the tracking controller (120) includes a hardware processor (121), memory (122), and repository (123). In one or more embodiments of the invention, the hardware processor (121) corresponds to the computer processors (702) depicted in FIG. 7A below. Similarly, the memory (122) and repository (123) correspond to the non-persistent storage (704) and/or persistent storage (706) depicted in FIG. 7A below. For example, the memory (122) may store software instructions that, when executed, cause the hardware processor (121) to perform FOV adjustment functionalities of the camera device (110) depicted in FIG. 1.1 above. In one or more embodiments, the tracking controller (120) performs the FOV adjustment functionalities according to the method flowchart described in reference to FIG. 2 below. In one or more embodiments, the memory (122) stores instructions to perform one or more portions of the method flowchart described in reference to FIG. 2 below. In one or more embodiments, the tracking controller (120) and the camera device (110) are integrated into a single device. In such embodiments, the instructions to perform one or more portions of the method flowchart described in reference to FIG. 2 are part of a mobile application, or mobile app, which is a user-installable software application designed to run on a smart phone or other mobile devices.

Further as shown in FIG. 1.2, the repository (123) includes a sequence of images (126), an light change pattern (124), a displacement (125), a movement parameter (128), and a target position (127). In particular, the sequence of images (126) includes consecutive images (e.g., image A (126a)) captured by the camera device (111). For example, the image A (126a) corresponds to a portion of the scene (140) that is covered by the FOV (141) at a particular time point. The light change pattern (124) is a pattern of light intensity and/or color alternating between different intensity levels and/or colors across the sequence of images (126). In one or more embodiments, the light change pattern (124) corresponds to a spot in each image of the sequence of images (126). For example, the spot may be defined by a pixel position or a collection of connected pixel positions in each image. In one or more embodiments, the light change pattern (124) is caused by a strobe light emitted from the light source (143) and indicates a location of the light source (143) within each image. In other words, the location of the light source (143) within each image may be determined based on where the light change pattern (124) is found across the sequence of images (126). For example, the light change pattern (124) indicates that the light source (143) is at the location A (127a) in the image A (126a). Similarly, each other image in the sequence of images (126) is associated with a location of the light source (143). The target position (127) is a pre-determined position that the tracking controller (120) is configured for tracking the object (142). For example, the target position (127) may be defined as the center of the FOV (141), which corresponds to the center of each image of the sequence of images (126). In other words, the tracking controller (120) is configured to adjust the FOV (141) such that the object (142) appears at the center (i.e., target position (127)) in the image after the adjustment. In other examples, the target position (127) may be defined as different positions from the center of the FOV (141). The displacement (125) is the distance between the target position (127) and the location (e.g., location A (127a)) of the light source (143) within an image. In one or more embodiments, the displacement (125) includes a horizontal direction distance and a vertical distance. The displacement (125) may be represented based on a number of pixels or any other suitable distance scale. In one or more embodiments, the object (142) may be a moving object such that the location (e.g., location A (127a)) of the light source (143) may vary from one image to next in the sequence of images (126). In such embodiments, the movement parameter (128) is a rate of change of the location (e.g., location A (127a)) of the light source (143) over time. For example, the movement parameter (128) may include a change in the location (e.g., location A (127a)) of the light source (143) from one image to next in the sequence of images (126). Depending on the moving direction of the object (142), the movement parameter (128) may include a horizontal portion and a vertical portion. Mathematically, the movement parameter (128) corresponds to a derivative of the displacement (125) over time.

In one or more embodiments, the tracking controller (120) performs the FOV adjustment functionalities based on the sequence of images (126), light change pattern (124), displacement (125), movement parameter (128), and target position (127) described above. Specifically, the tracking controller (120) performs the FOV adjustment functionalities using the method described in reference to FIG. 2 below. An example of the sequence of images (126), light change pattern (124), displacement (125), and movement parameter (128) is described in reference to FIGS. 4-6 below.

FIG. 2 shows a flowchart in accordance with one or more embodiments. The process shown in FIG. 2 may be executed, for example, by one or more components discussed above in reference to FIGS. 1.1 and 1.2. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, in Step 201, a light source within a scene is activated. In one or more embodiments of the invention, the light source is attached to an object in the scene. In one or more embodiments, the light source emits a strobe light, which changes intensity and/or color from time to time. For example, the strobe light emits a free-running light pattern in response to the light source being activated (e.g., turned on). In one or more embodiments, the light source emits a strobe light with a low repetition rate (e.g., 10 hertz, 20 hertz, etc.) comparing to a frame rate of a camera device. In one or more embodiments, the light source emits a strobe light that is synchronized with the frame rate of the camera device. For example, the strobe light may be initiated and/or synchronized based on a trigger signal sent from a tracking controller and/or the camera device.

In Step 202, a sequence of images of the scene is captured by a camera device. In particular, the object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the light source emits the strobe light. In one or more embodiments, the frame rate of the sequence of images is selected based on the duty cycle and/or repetition rate of the light source such that consecutive images (or a pair of images with a particular separation in the sequence) include alternating bright level and dark level, and/or alternating colors from the light source. For example, the light source may be free running and the frame rate is selected based on a pre-determined duty cycle and/or repetition rate of the free running light source. In one or more embodiments, a timer of the camera device is used to control image capture according to the selected frame rate.

In one or more embodiments, the duty cycle and/or repetition rate of the light source is selected based on the frame rate of the sequence of images such that consecutive images (or a pair of images with a particular separation in the sequence) include alternating bright level and dark level, and/or alternating colors from the light source. For example, the frame rate may be pre-determined and the light source is synchronized to the frame rate, e.g., based on a trigger signal from the camera device.

In Step 203, based on a local light change pattern across the sequence of images, the light source is detected in the scene. Specifically, the strobe light emitted from the light source causes changes in light intensity and/or color received by an optical sensor of the camera device resulting in the local light change pattern across the sequence of images. In one or more embodiments, the intensity of the strobe light is adjusted to control the size of the location where the local intensity change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating colors, in consecutive images, as recognized by the optical sensor of the camera device, exceeds a pre-determined threshold. In one or more embodiments, the location is referred to as the location of the light source in the image.

In one or more embodiments, a pair of images in the sequence of images are compared by subtraction of intensity and/or color values of corresponding pixels. Specifically, the intensity and/or color values are generated by the optical sensor. In particular, the intensity and/or color value of a pixel in one image is subtracted from the intensity and/or color value of the corresponding pixel in another image to generate a subtraction result. The pixel where the difference in alternating bright level and dark level, and/or alternating colors, is found in the subtraction result is selected as part of the location of the light source in the image. Depending on the duty cycle/repetition rate of the light source versus the frame rate of the sequence of images, the pair of images may be consecutive images or two images separated by a particular number of images, such as every three images, etc.

In Step 204, the sequence of images is analyzed to determine a location of the light source in at least one image and a movement of the light source across the sequence of images. In one or more embodiments, the location of the light source is determined based on where the difference in alternating bright level and dark level, and/or alternating colors in the sequence of images, as recognized by the optical sensor of the camera device, exceeds the pre-determined threshold. In one or more embodiments, the movement of the light source is determined based on a rate of change of the location over the sequence of images.

In Step 205, in response to detecting the light source, the location of the light source and a target position within at least one image are compared to generate a result. In one or more embodiments, the result includes the displacement from the location to the target position. In one or more embodiments, the displacement may vary from one image to next in the sequence of images, indicating that the object is a moving object. In such embodiments, the rate of change of the displacement over time, e.g., from one image to next, is computed as a movement parameter.

In Step 206, a control signal is generated based on the result for orienting the camera device. In one or more embodiments, the control signal is configured to adjust the orientation of the camera lens in the opposite direction to the displacement. For example, if the displacement indicates that the target position is to the right of the light source location within the image, the control signal adjusts the orientation of the camera lens toward the left. In one or more embodiments, the control signal is configured to adjust the relative position of the camera with respect to the scene in the opposite direction to the displacement. For example, if the displacement indicates that the target position is to the right of the light source location within the image, the control signal adjusts the relative position of the camera toward the left. In one or more embodiments, the movement parameter is considered in fine tuning the amount of adjustment caused by the control signal.

In Step 207, the control signal is sent to a camera device holder (e.g., a tilt-and-swivel device or a mechanical stage) where the camera device is mounted. Accordingly, the orientation of the camera lens or a relative position of the camera device is adjusted in the opposite direction to the displacement.

In Step 208, a substantial alignment between the target position and the light source is detected within the FOV of the camera device. In particular, the substantial alignment is a result of adjusting the orientation of the camera lens or a relative position of the camera device in the opposite direction to the displacement.

In Step 209, in response to detecting the substantial alignment, an additional image of the scene is captured. In one or more embodiments, consecutive images are continuously captured and outputted by the camera device at a regular repetition rate (i.e., frame rate). In such embodiments, the sequence of images that is analyzed to generate the control signal is limited to a rolling time window (e.g., a rolling sequence of 2 consecutive images, 5 consecutive images, 10 consecutive images, etc.) that precedes the additional image. As time passes, the additional image becomes part of an updated sequence of images for generating an updated control signal to continuously track the object in the FOV.

In one or more embodiments, the sequence of images that is analyzed to generate the control signal is designated as control information without being outputted by the camera device. In contrast, the additional image where the light source (hence the object) substantially aligns with the target position is outputted by the camera device. For example, the control information may be stored separate from the additional image until being discarded or otherwise removed from the camera device.

In Step 210, a determination is made as to whether image capturing is to continue. If the determination is positive, i.e., the image capturing is to continue, the method returns to Step 202. If the is negative, i.e., the image capturing is not to continue, the method ends.

FIGS. 3A, 3B, 4, 5, and 6 show various examples in accordance with one or more embodiments of the invention. The examples shown in FIGS. 3A, 3B, 4, 5, and 6 may be, for example, based on one or more components depicted in FIGS. 1.1 and 1.2 above and the method flowchart depicted in FIG. 2 above. In one or more embodiments, one or more of the modules and elements shown in FIGS. 3A, 3B, 4, 5, and 6 may be omitted, repeated, and/or substituted. Accordingly, embodiments of the invention should not be considered limited to the specific arrangements of modules shown in FIGS. 3A, 3B, 4, 5, and 6.

Figure 3A:
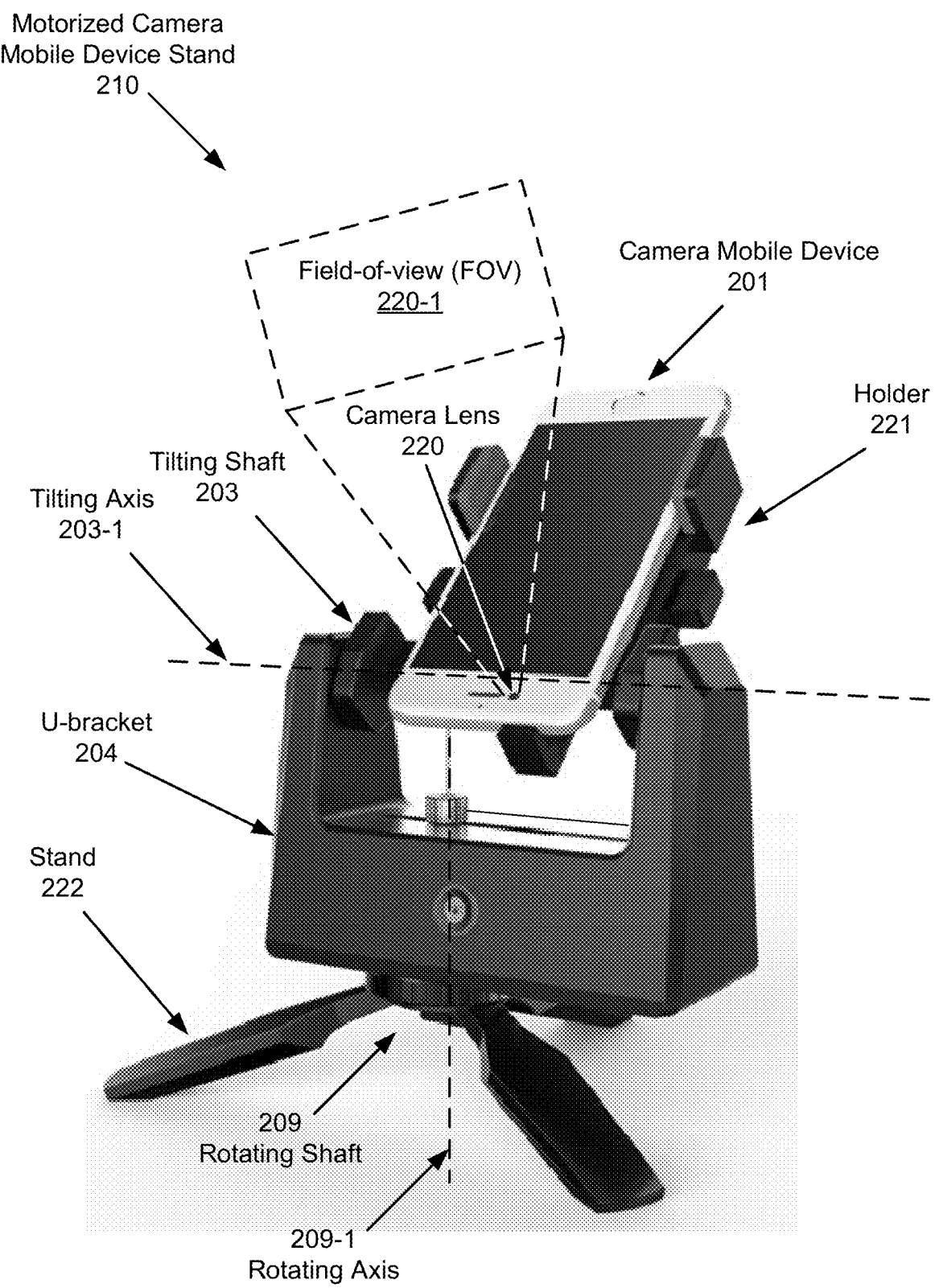
FIGS. 3A, 3B, 4, 5, 5A, 5B, 6, 6A, 6B, 6C, and 6D show various examples in accordance with one or more embodiments of the invention.

FIG. 3A shows a motorized camera mobile device stand (210) as an example of the camera device holder (130) depicted in FIG. 1.1 above. In addition, a camera mobile device (201) (e.g., a smart phone having a camera lens (220)), mechanically held by the motorized camera mobile device stand (210), is an example of the camera device (110) depicted in FIG. 1.1 above. In one or more embodiments of the invention, the motorized camera mobile device stand (210) is an electro-mechanical assembly that includes a holder (221), a tilting shaft (203), an U-bracket (204), a rotating shaft (209), and a stand (222). The holder (221) is configured to mechanically hold the camera mobile device (201) and mechanically couple to the tilting shaft (203). The stand (222) is configured to maintain, while being placed on a solid surface, mechanical stability of the motorized camera mobile device stand (210). Although not explicitly shown, the U-bracket (204) houses a tilting motor coupled to the tilting shaft (203), a rotating motor coupled to the rotating shaft (209), and a communication interface configured to communicate with the camera device (110) and/or the tracking controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor in response to a control signal received from the tracking controller (120) via the communication interface. Similarly, the tilting shaft (203) is rotatable by the tilting motor around a tilting axis (203-1) in response to the control signal received from the tracking controller (120) via the communication interface. In response to tilting the holder (221) around the tilting axis (203-1) and/or rotating the holder (221), collectively with the tilting shaft (203) and the bracket (204), around the rotating axis (209-1), the orientation of the camera lens (220) may be adjusted. Accordingly, the FOV (220-1) of the camera lens (220) is adjusted according to the orientation of the camera lens (220).

Figure 3B:
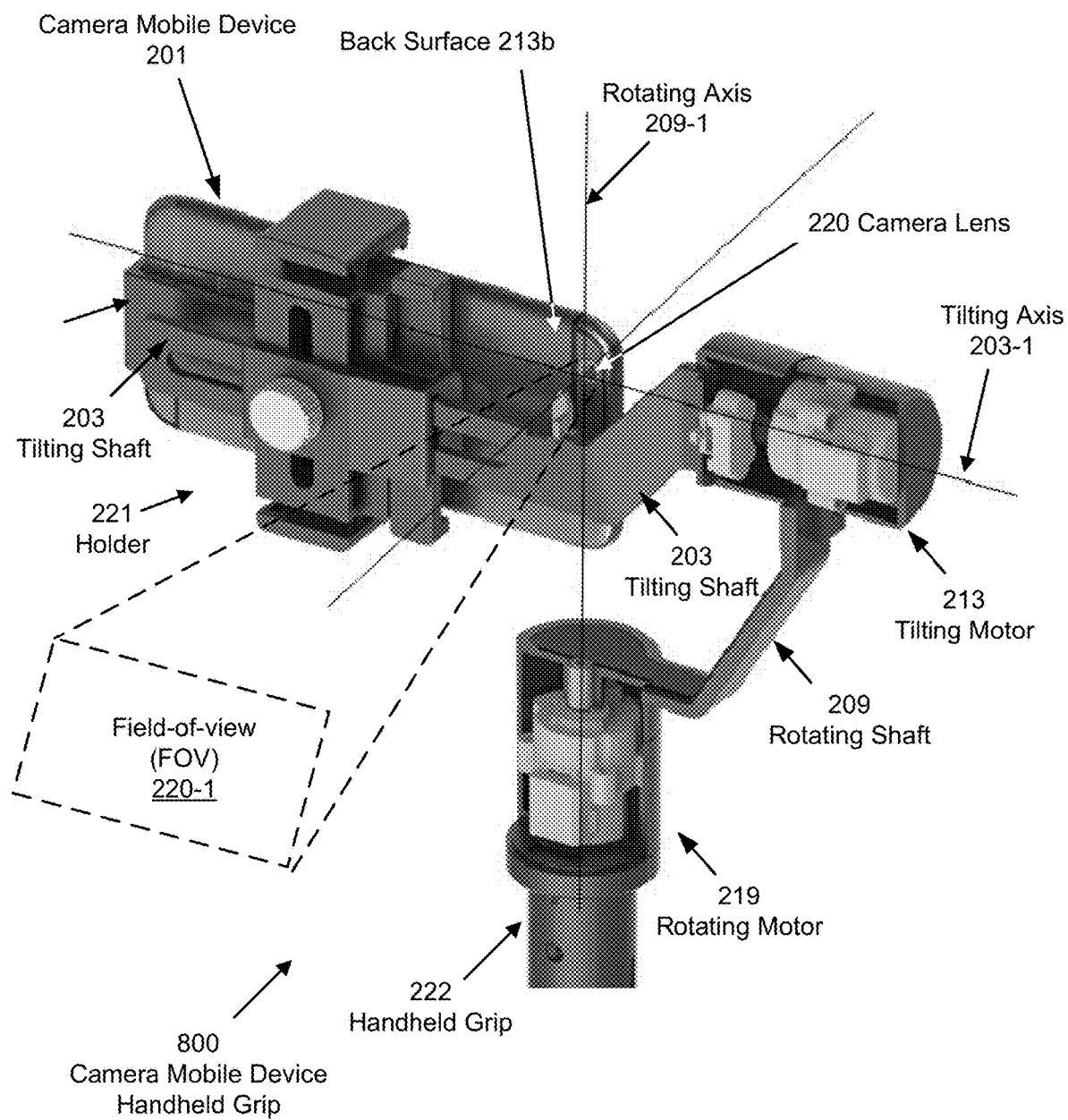

FIG. 3B shows a camera mobile device handheld grip (800) as an example of the camera device holder (130) depicted in FIG. 1.1 above. In addition, a camera mobile device (201) (e.g., a smart phone having a camera lens (220)), mechanically held by the camera mobile device handheld grip (800), is an example of the camera device (110) depicted in FIG. 1.1 above. In one or more embodiments of the invention, the camera mobile device handheld grip (800) is an electro-mechanical assembly that includes a holder (221), a tilting shaft (203), an tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) and/or the tracking controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the tracking controller (120) via the communication interface. Similarly, the tilting shaft (203) is rotatable by the tilting motor (213) around a tilting axis (203-1) in response to the control signal received from the tracking controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220).

Figure 4:
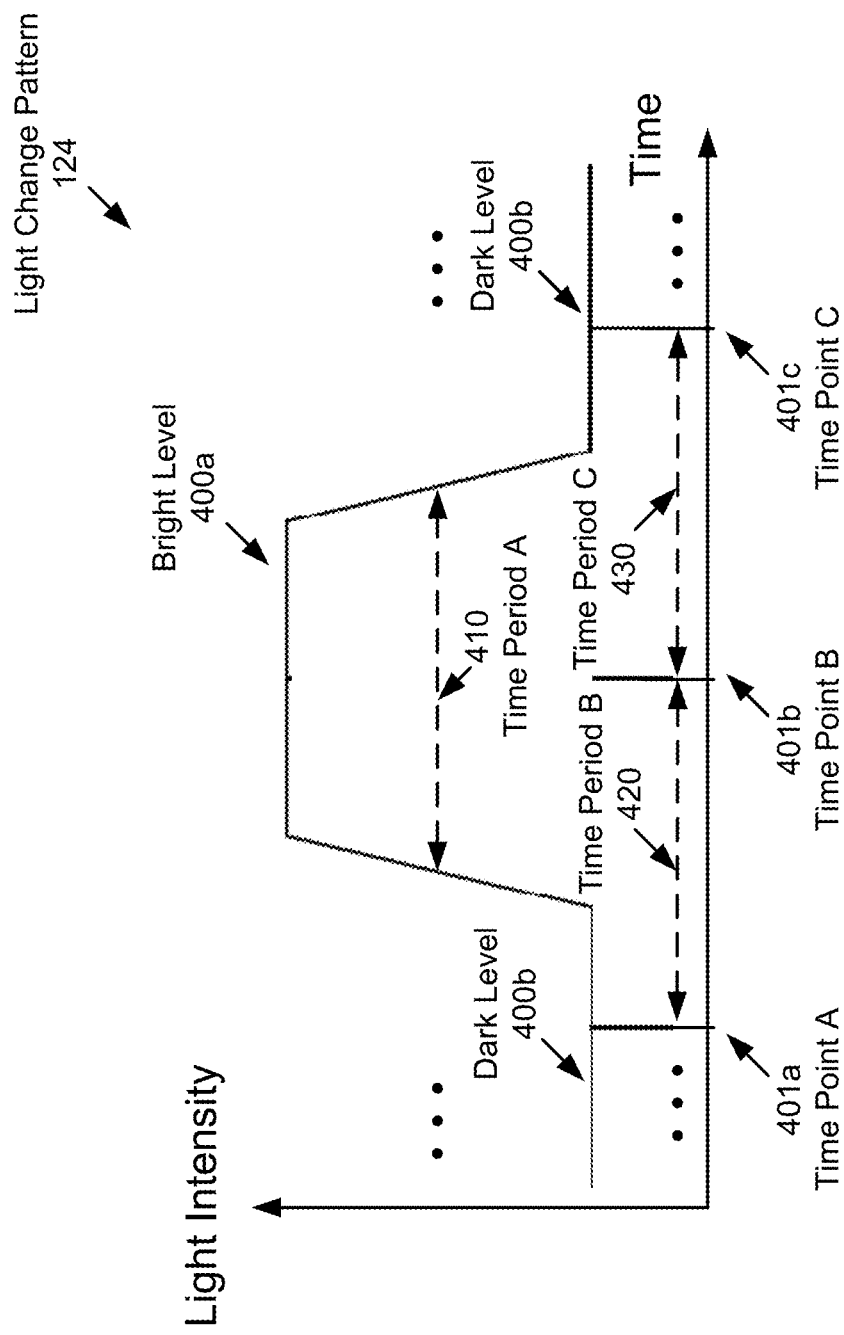

FIG. 4 shows an example of the light change pattern (124) of the light source (143) depicted in FIGS. 1.1 and 1.2 above. As shown in FIG. 4, the horizontal axis corresponds to time and the vertical axis corresponds to light intensity. In particular, the light change pattern (124) is a pattern of light intensity alternating between a light level (400*a*) and a dark level (400*b*) over time. For example, the light level (400*a*) of the light intensity sustains over a time period A (410) and may be recurring over time with certain repetition rate. While the light intensity alternates between the light level (400*a*) and the dark level (400*b*) over time, a sequence of images is captured by a camera device periodically. For example, consecutive images in the sequence may be captured at a time point A (401*a*), time point B (401*b*), time point C (401*c*), etc. that are separate from each other by a time period B (420), time period C (430), etc. In particular, the time period A (410) encompasses at least one image capture time point, such as the time point B (401*b*). Although the light change pattern (124) depicted in FIG. 4 is a pattern of light intensity changes, the light change pattern (124) may also include color changes in other examples. In other words, the light level (400*a*) and dark level (400*b*) may be substituted or supplemented by different colors to represent color changes.

Figure 5:
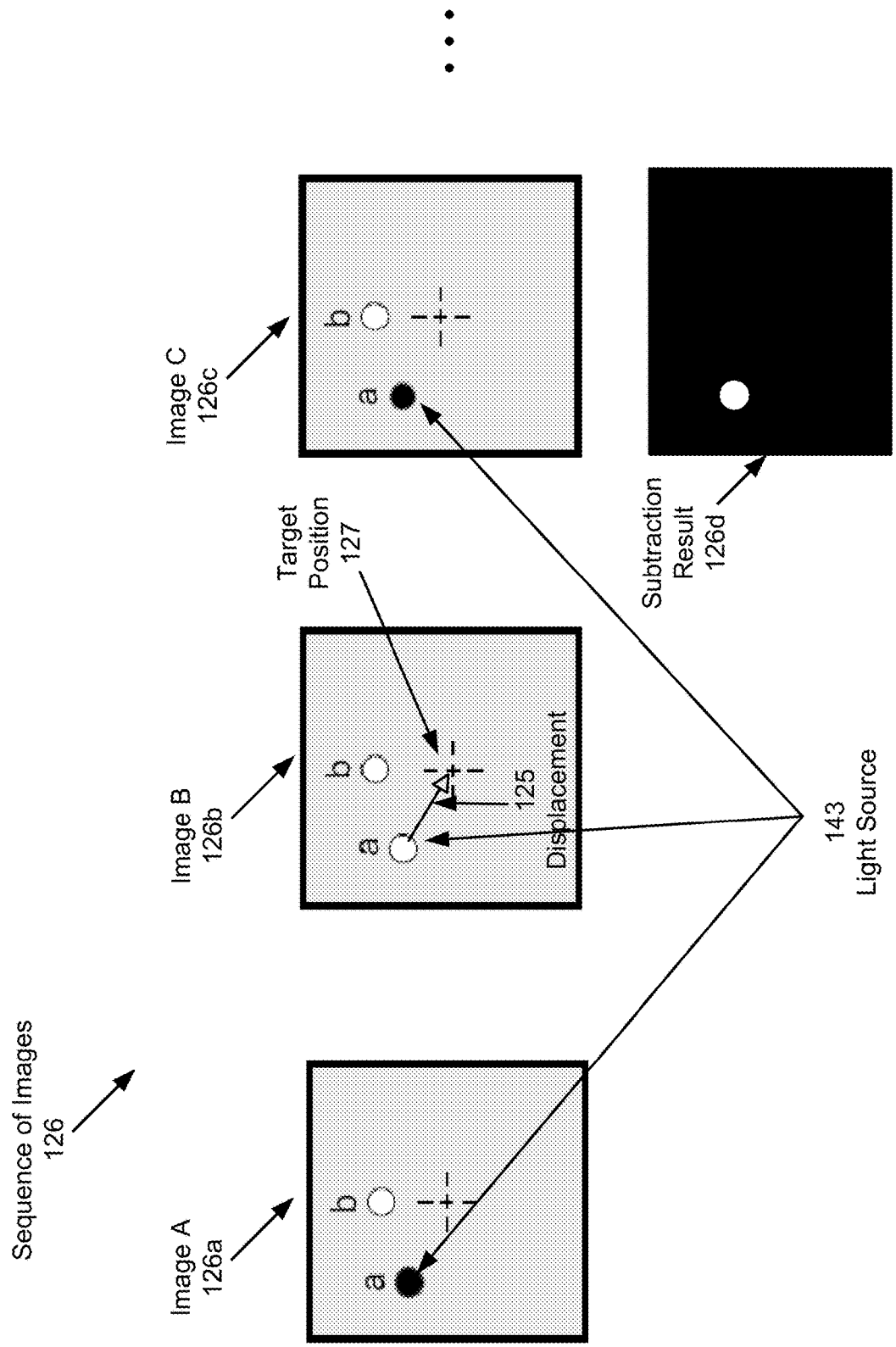

FIG. 5 shows an example of the sequence of images (126) of the scene (140) depicted in FIGS. 1.1 and 1.2 above. As shown in FIG. 5, the sequence of images (126) includes the image A (126*a*), image B (126*b*), image C (126*c*), etc. that are captured at the time point A (401*a*), time point B (401*b*), time point C (401*c*), etc. depicted in FIG. 4 above. According to the example of the light change pattern (124) described in reference to FIG. 4 above, the light source (143) appears as an alternating dark and bright spot at a location marked "a" in the image A (126*a*), image B (126*b*), image C (126*c*), etc. In contrast, the light intensity remains substantially constant at another location marked "b" in the image A (126*a*), image B (126*b*), image C (126*c*), etc. For example, the location marked "a" may be determined by subtracting intensity values of corresponding pixels in the image A (126*a*) and image B (126*b*) to generate the subtraction result (126*d*). Similarly, the location marked "a" may be further determined by subtracting intensity values of corresponding pixels in the image B (126*b*) and image C (126*c*) to generate the subtraction result (126*d*). In the subtraction result (126*d*), black color indicates no difference and white color indicates a non-zero difference. Accordingly, the location of the light source corresponds to the white spot in the subtraction result (126*d*).

Further as shown in FIG. 5, the center of each image is defined as the target position (127). Accordingly, the distance from the location marked "a" to the target position (127) corresponds to the displacement (125). The location marked "a", the target position (127), and the displacement (125) shown in FIG. 5 are examples of the location A (127*a*), target position (127), and displacement (125), respectively, depicted in FIG. 1.2 above. In one or more embodiments, the location marked "a" varies between the image A (126a), image B (126b), image C (126c), etc. The rate of change of the location marked "a" across image A (126a), image B (126b), image C (126c), etc. corresponds to the movement parameter (128) depicted in FIG. 1.2 above.

Figure 5A:
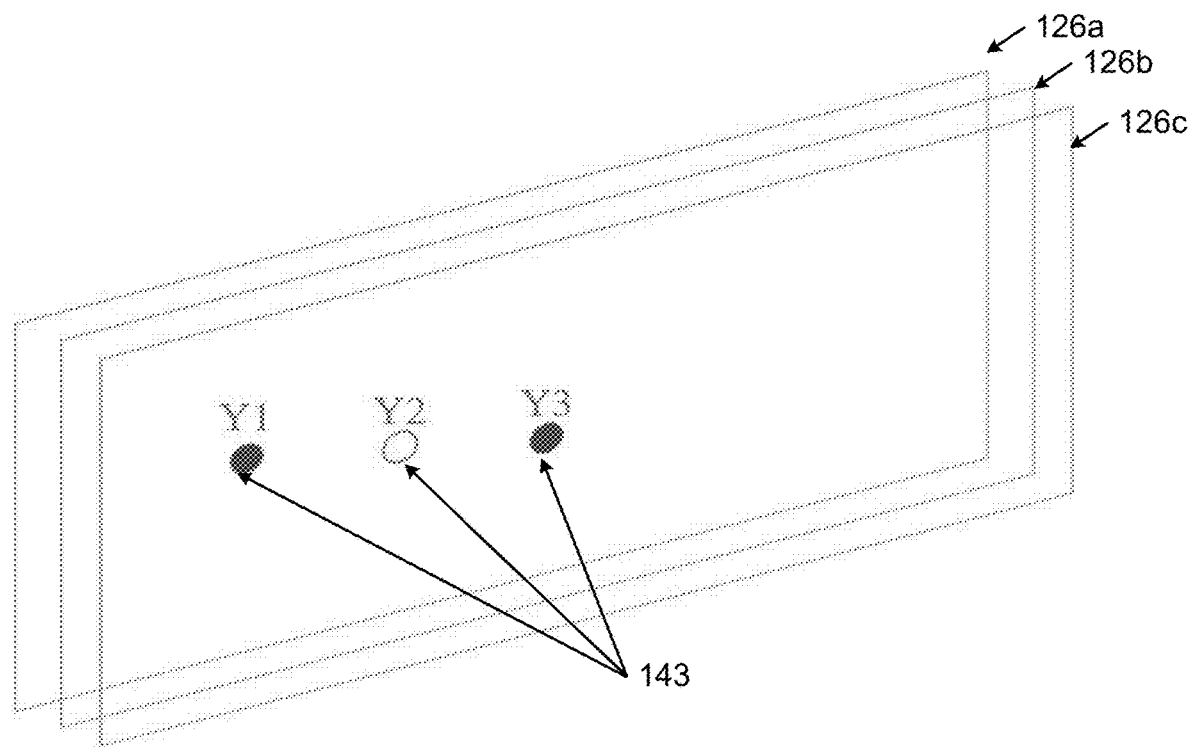
Figure 5B:
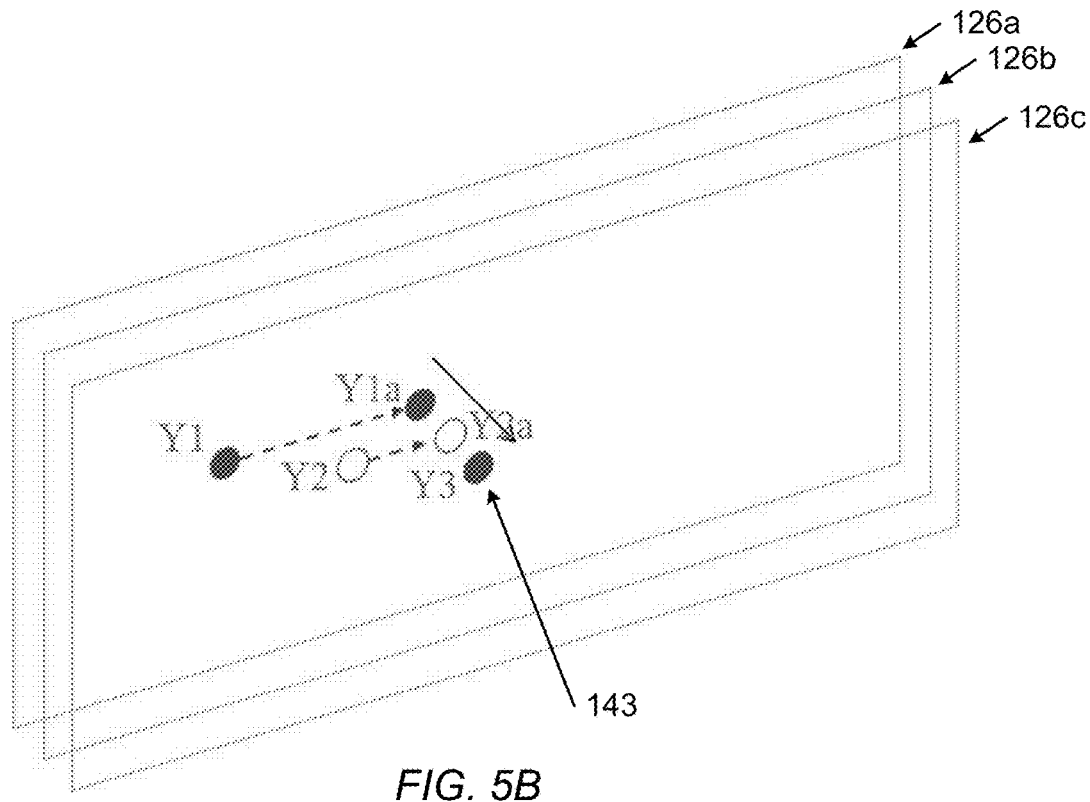

While the light source (143) corresponds to the same pixel position in the image A (126a), image B (126b) and image C (126c) that are aligned as depicted in FIG. 5 above, FIGS. 5A and 5B show an example of moving light source captured in different images when tracking the movement of the object. Due to the movement of the light source (143) in the FOV (141), the light source (143) in FIG. 5A corresponds to different pixel positions Y1, Y2 and Y3 in the image A (126a), image B (126b) and image C (126c), respectively. The mismatch between the different pixel positions Y1, Y2 and Y3 results in inaccuracy or uncertainty of the pixel position of the light source (143). Therefore, in one or more embodiments, when detecting light source in the scene, the movement parameter (128) is determined such that motion prediction is performed according to the image capture time point difference between different images to improve accuracy of determining the pixel position of the light source (143). For example, the movement parameter (128) may be determined in the unit of number of pixels per unit time (e.g., millisecond). FIG. 5B shows the image A (126a), image B (126b) and image C (126c) that are adjusted based on the movement parameter (128) and the image capture time points. The pixel positions of Y1 and Y2 are compensated with an offset equaling the product of the movement parameter (128) and the elapse time between image capture time points. For example, the pixel position Y1 is adjusted to be Y1a using an offset based on the elapse time between the time point A (401a) and time point C (401c) measured in milliseconds. Similarly, the pixel position Y2 is adjusted to be Y2a using an offset based on the elapse time between the time point B (401b) and time point C (401c) measured in milliseconds. After accounting for the movement of the light source (143), Y1a, Y2a and Y3 are aligned at the same pixel position to reduce the inaccuracy or uncertainty in determining the pixel position of the light source (143).

In one or more embodiments, the light source (143) emits infrared light at a larger angle (e.g., a scattering angle of more than 90 degrees), and the camera device (110) has a camera lens (111) with a field of view (FOV) (141) of more than 60° (such as a wide-angle lens or Fisheye lens). This configuration ensures that the emitting coverage area and the receiving coverage area overlap each other when the light source (143) is blocked or moving at high speed. In one or more embodiments, the light source (143) has a function of receiving a control signal, which may be sent by the camera device (110) or other device with a communication function in the system (100). In particular, the light source (143) transmits a specific light change pattern according to the control signal. For example, the frequency, duration, and/or modulation of the frequency/duration of the light change pattern (124) may be altered by the light source (143) based on the control signal. The light change pattern (124) may be adjusted in real time or delayed according to the control signal. According to the adjustment of the light change pattern (124) based on the control signal, the camera device (110) adjust the image capture frame rate to synchronize with the light change pattern (124). Synchronizing with the light change pattern (124) means a pair of images at a fixed interval includes alternating intensity (e.g., bright and dark) levels, and/or alternating wavelengths from the light source (143). For example where the fixed interval is one image frame, the pair of images at fixed interval may be each pair of consecutive frames in a sequence of image frames. In another example where the fixed interval is two image frames, the pair of images at fixed interval may be each pair of consecutive even (or odd) frames in a sequence of image frames. In yet another example, the fixed interval may be any fixed number of frames in sequential frames of images. Adjusting the fixed interval allows the camera device (110) to synchronize with changing repetition rate of the light change pattern (124) with more flexibility in variable object movement speed application.

Figure 6:
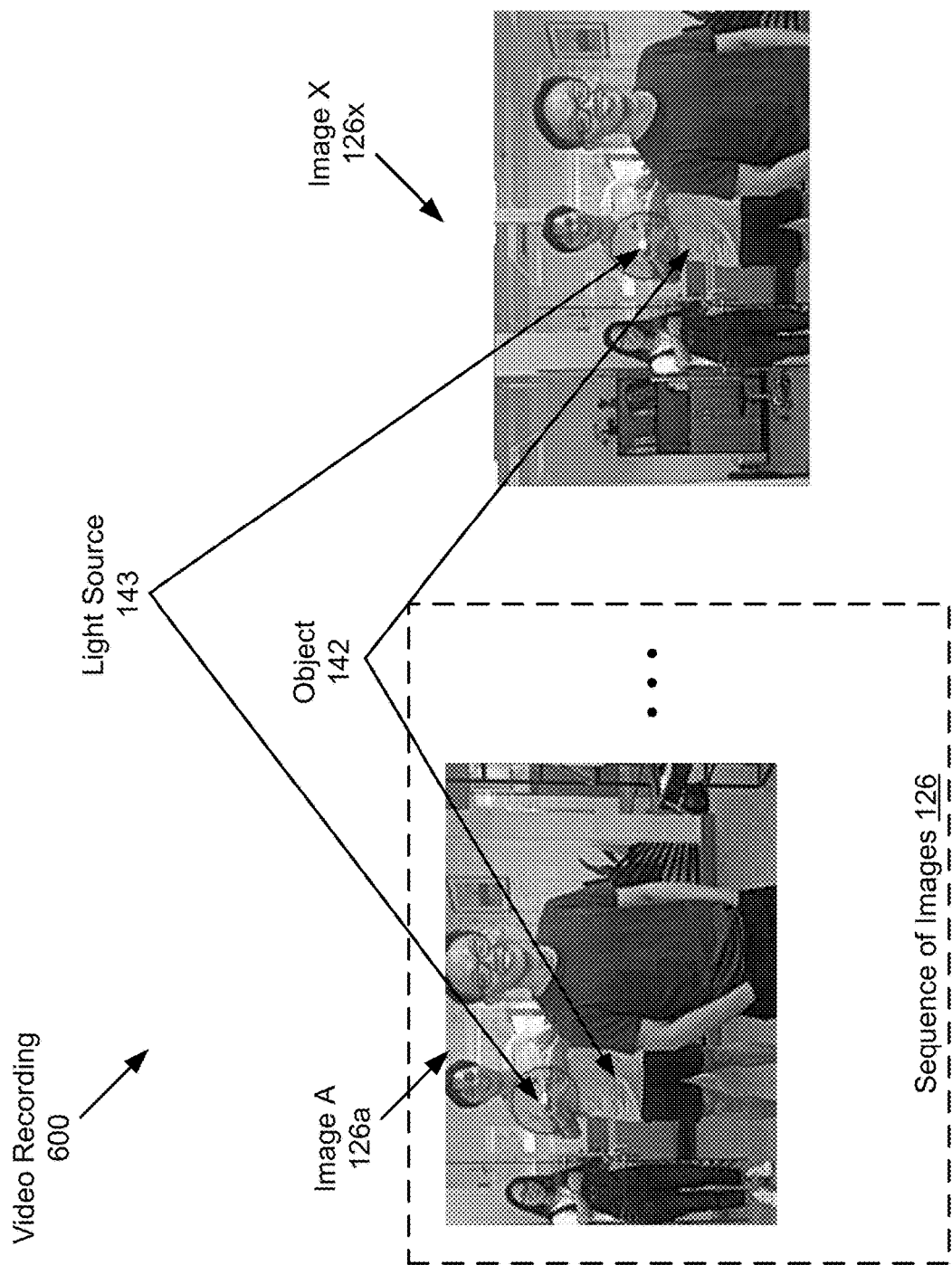

FIG. 6 shows an example video recording (600) that includes the example of the sequence of images (126) described in reference to FIG. 4 above. In an example scenario, the target position is the center of the image. As shown in FIG. 6, the light source (143) is identified at a location in the left portion of the images (e.g., image A (126a)) in the sequence of images (126). In particular, the light source (143) is held by both hands of a male person (i.e., object (142)). For example, the location of the light source (143) is identified based on the alternating dark and bright spot in the image A (126a), image B (126b), image C (126c), etc. depicted in FIG. 5 above. In other words, the light source (143) corresponds to the location marked "a" in the image A (126a), image B (126b), image C (126c), etc. depicted in FIG. 5. Because the target position (i.e., image center) is to the right of the light source location, the object tracking controller (120) is configured to orient the camera device (110) toward the left such that the male person (i.e., object (142)) holding the light source (143) appears in the center of the image. Accordingly, the orientation of the camera device (110) is adjusted based on the identified location "a" of the light source (143) such that the object (142) appears in the center of the image X (126a).

FIGS. 6A, 6B, 6C, and 6D show various examples in accordance with one or more embodiments of the invention. The examples shown in FIGS. 6A, 6B, 6C, and 6D may be, for example, based on one or more components depicted in FIGS. 1.1 and 1.2 above and the method flowchart depicted in FIG. 2 above. In one or more embodiments, one or more of the modules and elements shown in FIGS. 6A, 6B, 6C, and 6D may be omitted, repeated, and/or substituted. Accordingly, embodiments of the invention should not be considered limited to the specific arrangements of modules shown in FIGS. 6A, 6B, 6C, and 6D.

Figure 6A:
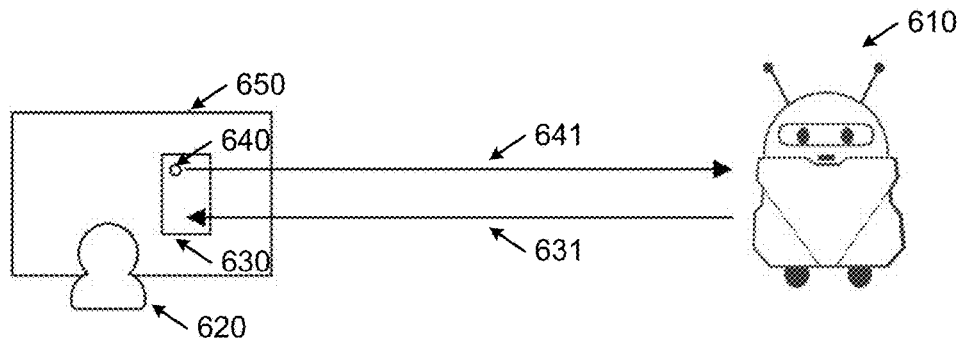
Figure 6B:
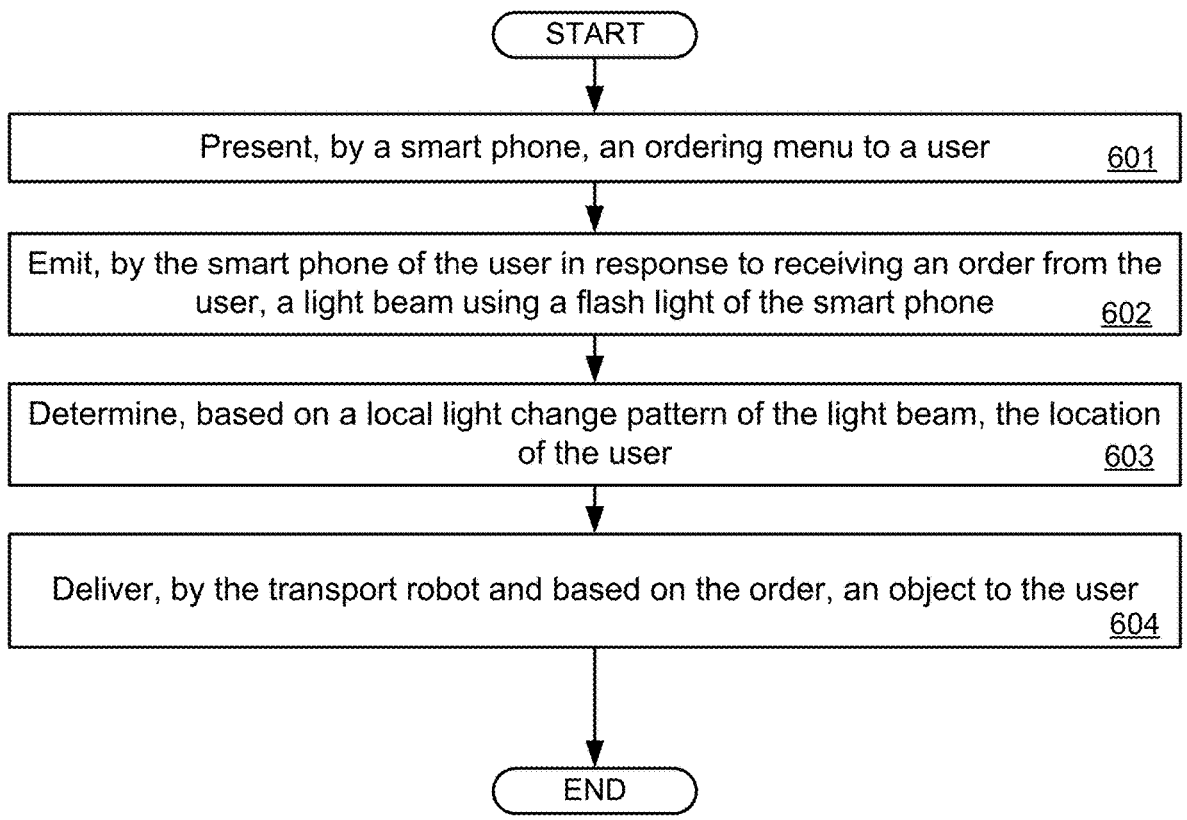

FIG. 6A shows an application example of the present invention in the field of transportation using light control equipment and transport robots. The light control equipment is provided with a light emitter (640) and a light controller (630) that form an example of the light source (143) depicted in FIG. 1.1 above. The transport robot (610) may be integrated with the camera device (110) with the camera lens (111) depicted in FIG. 1.1 above. Alternatively, the camera device (110) with the camera lens (111) may be installed in an external monitoring device (not shown) that is separate from and communicates with the transportation robot (610). The camera lens (111) has optical characteristics that are compatible with the light emitter (640). If the light emitter (640) emits infrared light, the camera lens (111) includes an IR or other lenses that can sense infrared light. The transport robot (610) may be integrated with the tracking controller (120) depicted in FIG. 1.1 above. Alternatively, the tracking controller (120) may be installed in an external tracking device (not shown) that is separate from and communicates with the transportation robot (610). In one or more embodiments, the light emitter (640) and light controller (630) are included in a smart phone, such as the camera mobile device (201) depicted in FIG. 3A above. For example, the smart phone may be possessed by a user (620) at a designated location, such as a restaurant table (650) in a restaurant corresponding to the scene (140) depicted in FIG. 1.1 above. In particular, the light emitter (640) is a flash light of the smart phone. An application program (e.g., a mobile app such as ordering software or logistics software) is installed on the smart phone to perform the function as the light controller (630), such as generating the light change pattern (124) depicted in FIG. 1.2 above. With reference to FIG. 6B, the user (620) enables the mobile app to control the flash light (i.e., light emitter (640) of the smart phone. In Step 601, the mobile app presents (e.g., displays) an ordering menu on the smart phone to the user (620). Accordingly, the user (620) enters an order that is received by the mobile app running on the smart phone. The order is transmitted by the smart phone to a source location, for example, the restaurant kitchen, where the ordered item was made or stored, to initiate fulfillment of the order. In Step 602, in response to receiving the order, the mobile app triggers the flash light of the smart phone to generate a flash (641) with a specific duration and frequency of the light change pattern (124). The flash rules (i.e., the specific duration and frequency of the light change pattern (124)) are stored in the smart phone and the transport robot (610). In Step 603, when the camera device (110) (e.g., installed on or separate from the transport robot (610)) detects a light source that conforms to the stored flash rules (i.e., light change pattern (124)), the tracking controller (120) (e.g., installed on or separate from the transport robot (610)) locates the location of the light source (i.e., the smart phone near the user (620) and the table (650)). The tracking controller (120) determines the location using the method described in reference to FIG. 2 above. Once the ordered item is ready to deliver from the restaurant kitchen (i.e. the source location), in Step 604, the transport robot (610) carries the ordered item from the kitchen and moves (631) toward the location of the light source (i.e., the smart phone near the user (620) and the table (650)) while maintaining the light source in the field of view (i.e., FOV (141)) of the camera device during the movement from the kitchen to the table (650). Moving the transport robot (610) while maintaining the light source (143) to be aligned with a target position within the FOV (141) results in a direct route to reach the table (650). Other navigating techniques may also be employed in combination to avoid collision with one or more obstacle(s) in the scene (e.g., other tables in the restaurant) while moving to reach the table (650).

Figure 6C:
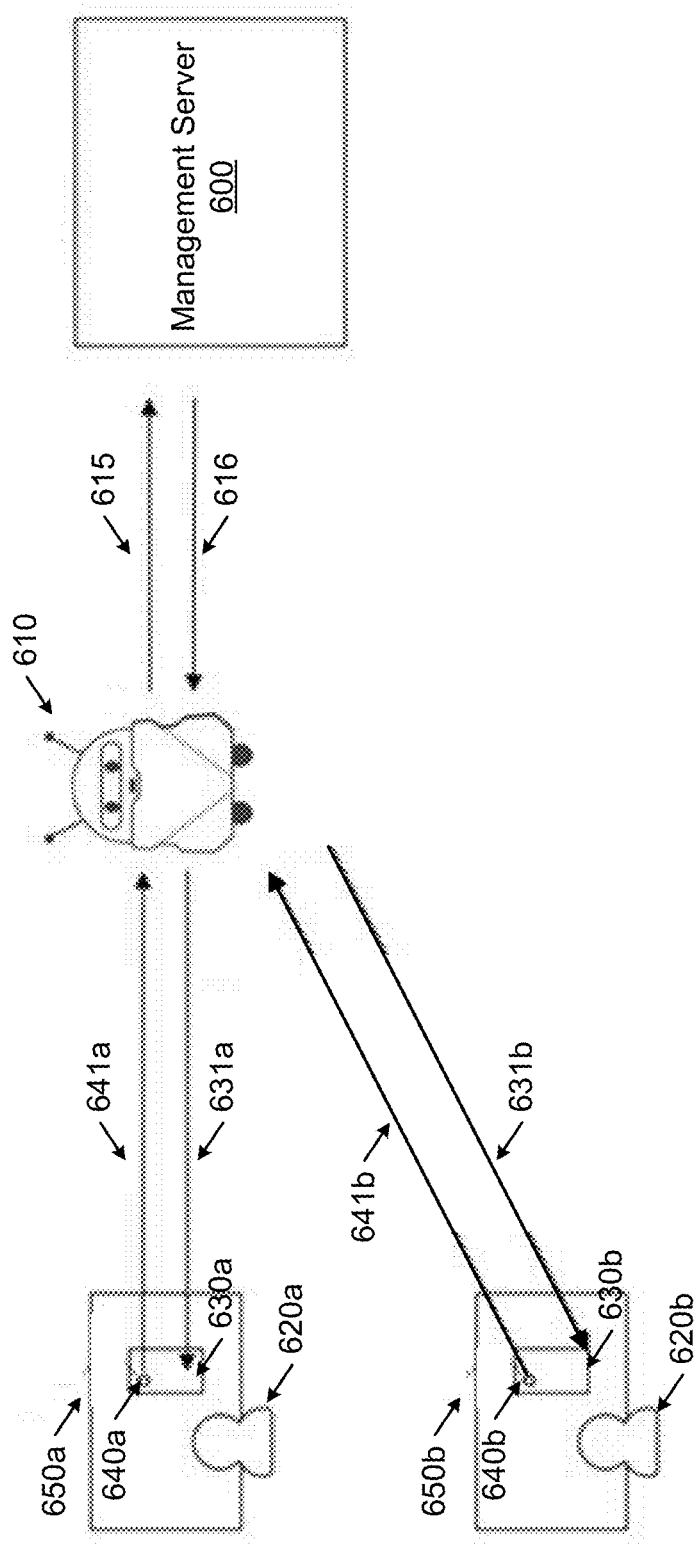
Figure 6D:
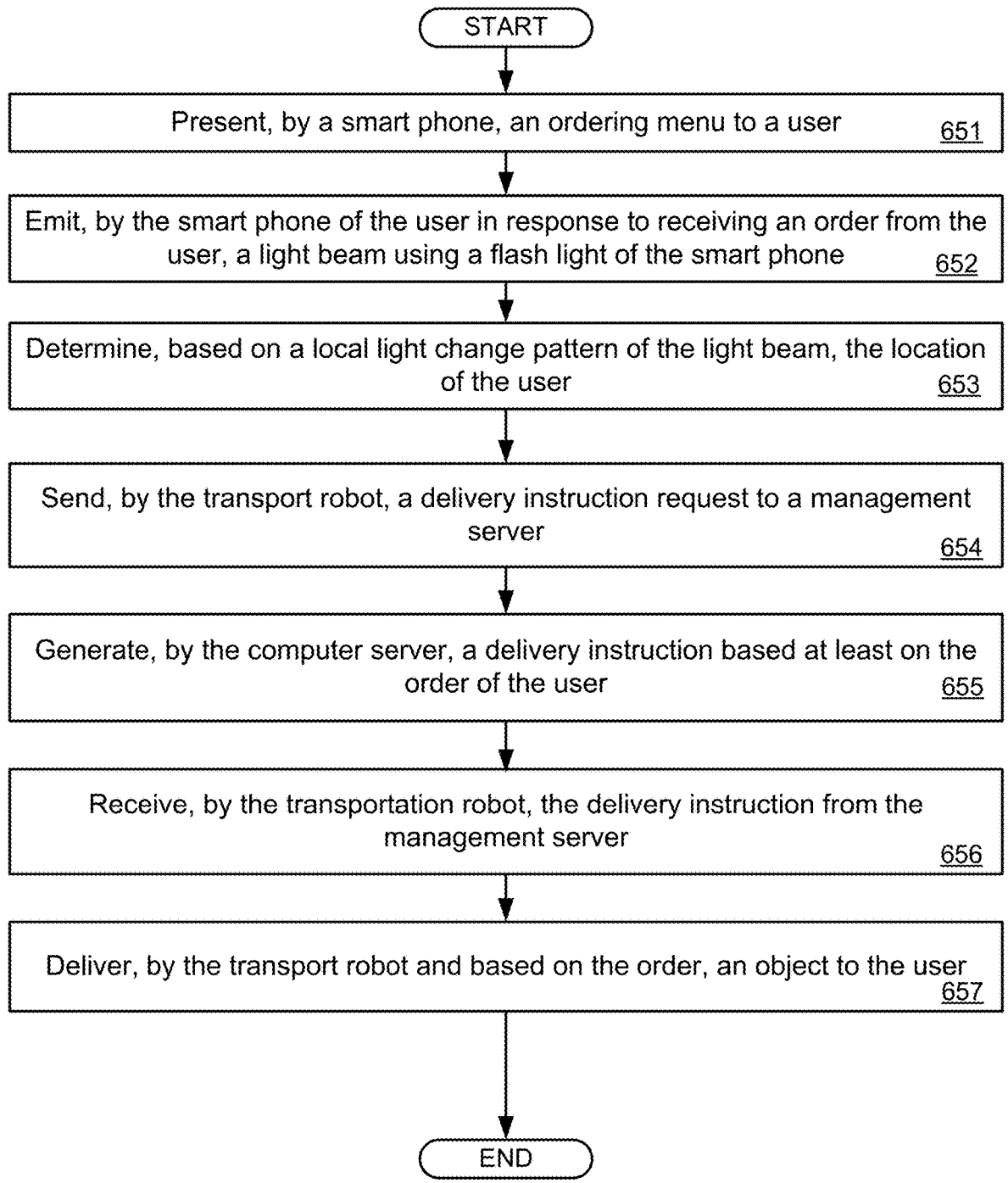

In one or more embodiments, the flash rules of different smart phones may be the same for some smart phones, or may contain different frequencies, durations, and/or modulations of frequency/duration as target identification codes for corresponding smart phones. For those smart phones having different flash rules containing different target identification codes, the target identification codes of the flash rules may be randomly selected by the mobile app, or selected by the mobile app according to pre-determined conditions (such as user account/mobile phone number, server allocation, scanning external QR codes, etc.). Based on the selection of different flash rules containing different target identification codes, light change patterns from different smart phones (e.g., different users in the same restaurant scene) do not interfere with each other at the same time in the same scene. As shown in FIG. 6C, in the same restaurant scene, the flash (641a) from the flash light (640a) of the mobile phone A (630a) with a particular target identification code and the flash (641b) from the flash light (640b) of the mobile phone B (630b) with a different target identification code are detected by the transport robot (610) to determine respective locations of the user A (620a) at table A (650a) and the user B (620b) at table B (650b). Both light sources comply with the flashing rules stored in and recognized by the transport robot (610). In a simple scenario, the transport robot (610) deliver (631a, 631b) the respective ordered items (e.g., dishes) of the user A (620a) and user B (620b) according to the temporal order in which the light sources are detected. In a relatively complex scenario, the orders may include multiple dishes to be delivered. The different dishes have different preparation time periods. With reference to FIG. 6D, Steps 651 through 653, corresponding to Steps 601 through 603 depicted in FIG. 6B above, are performed for the user A (620a) and user B (620b). In Steps 654 through 657, the transport robot (610) communicates with the management server (600) of the restaurant to manage the order delivery. Specifically, in Step 654, the management server (600) receives delivery instruction requests (615) from the transport robot (610) corresponding to respective orders of the user A (620a) and user B (620b). Based on the preparation time periods of the dishes, in Step 655, the management server (600) generates a delivery instruction (616) that specifies the delivery schedule (i.e., delivery time and sequential order) of each of the dishes included in the orders of the user A (620a) and user B (620b). In Step 656, the transport robot (610) receives the delivery instruction (616) from the management server (600) to deliver, in Step 657, the orders of the user A (620a) and user B (620b).

In the embodiments described above, the light emitter (640) and light controller (630) are included in a smart phone. In alternative embodiments, the light emitter (640) and light controller (630) (corresponding to the light source (143) depicted in FIG. 1.1 above) may be configured as a mobile device different than the smart phone, such as a flashing stick or bracelet with a control board, etc. attached to a user (corresponding to the object (142) depicted in FIG. 1.1 above) to facilitate object identification, unmanned transportation, or rescue work that is performed in a specific environment. In one or more embodiments, the camera device (110) with the camera lens (111) and the tracking controller (120), depicted in FIG. 1.1 above, may be provided in an external monitoring device of the specific environment for perform such object identification, unmanned transportation, or rescue work. During the unmanned transportation or rescue work, the external monitoring device detects the light source (143) attached to the object (142), and causes (e.g., via wireless communication) the transport robot (610) to locate and move the object (142) along with the light source (143) to the transportation or rescue destination.

Figure 7A:
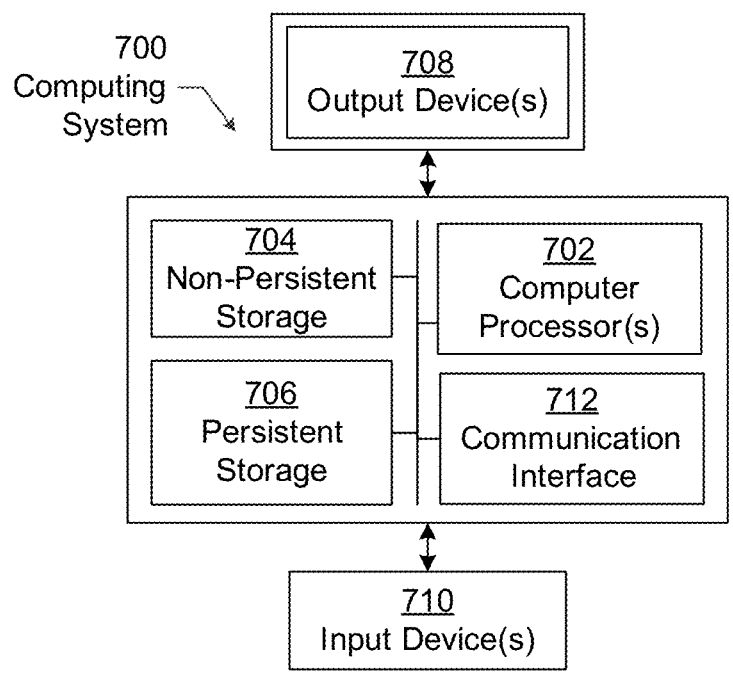
FIGS. 7A and 7B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
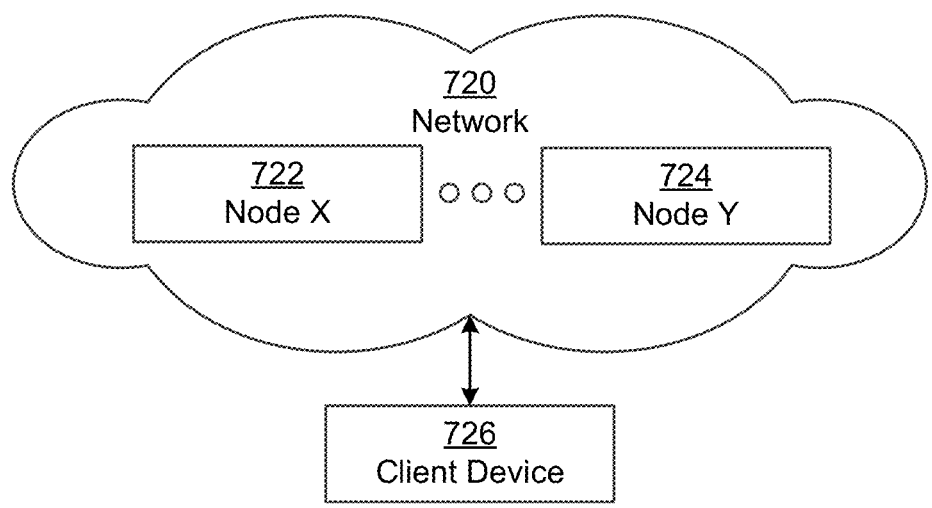

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for object tracking, comprising:
   capturing, using a single optical sensor of a camera device, a sequence of images of a scene;
   detecting, based on a pattern of local light change across the sequence of images captured by the single optical sensor, a light source in the scene;
   comparing, in response to detecting the light source, a location of the light source in at least one image of the sequence of images and a current position of a transport robot to generate a result; and
   generating, based on the result, a control signal for moving the transport robot toward the light source such that the light source aligns with a target position within a field-of-view of the camera device,
   wherein the pattern of local light change identifies at least a first pixel position in the at least one image as the location of the light source, wherein the target position corresponds to at least a second pixel position in the at least one image, and wherein the result comprises a pixel position displacement between at least the first pixel position of the light source and at least the second pixel position of the target position.

2. The method of claim 1, further comprising:

sending the control signal to the transport robot where the camera device is mounted;

detecting, in response to sending the control signal, an alignment between the target position and the light source within the field-of-view; and further capturing, using the camera device and in response to detecting the alignment, an additional image of the scene, wherein the field-of-view of the camera device is changed, by a movement of the transport robot toward the light source in response to the control signal, in a direction opposite to the pixel position displacement, wherein the alignment corresponds to an overlap between the light source and at least the second pixel position within the field-of-view, and wherein the light source is attached to an object in the scene such that the object overlaps at least the second pixel position in the additional image.

3. The method of claim 1, wherein the pattern of local light change across the sequence of images is produced by a strobe light emitted from the light source.

4. The method of claim 1, wherein the pattern of local light change comprises at least one selected from a group consisting of a light intensity change, a light color change, and a combination of light intensity and color change.

5. The method of claim 1, further comprising:

analyzing the sequence of images to determine the location of the light source in the at least one image and a movement of the light source across the sequence of images, wherein generating the control signal is further based on the movement.

6. The method of claim 3, wherein the scene comprises a user at a designated location, wherein the light source is a flash light of a smart phone of the user, wherein the sequence of images and the additional image are part of a sequence of video frames in a video recording captured by the camera device mounted on the transport robot, the method further comprising:
  presenting, using the smart phone, an ordering menu to the user;
  receiving, by the smart phone, an order specifying at least one item selected by the user from the ordering menu; and
  activating, by the smart phone in response to receiving the order, the flash light to emit the strobe light,
  wherein the transport robot delivers, based on the control signal, the at least one item from a source location to the user at the designated location.

7. The method of claim 6, further comprising:

sending, by the smart phone to a management server, the order received from the user, wherein the order is among a plurality of orders comprising a plurality of items selected by a plurality of users using a plurality of smart phones;

sending, by the transport robot to the management server in response to at least detecting the light source in the scene, a request for delivery instruction;

generating, by the management server based on the plurality of orders, the delivery instruction that specifies a schedule of delivery of the plurality of items to the plurality of users, wherein the transport robot delivering the at least one item from the source location to the user at the designated location is according to the schedule of delivery.

8. A tracking controller for a transport robot, comprising:

a computer processor; and memory storing instructions, when executed, causing the computer processor to:
  obtain a sequence of images of a scene, wherein the sequence of images is captured by a single optical sensor of the camera device;
  detect, based on a pattern of local light change across a sequence of images captured by the single optical sensor, a light source in the scene;
  compare, in response to detecting the light source, a location of the light source in at least one image of the sequence of images and a current position of a transport robot to generate a result; and
  generate, based on the result, a control signal for moving the transport robot toward the light source such that the light source aligns with a target position within a field-of-view of the camera device, wherein the pattern of local light change identifies at least a first pixel position in the at least one image as the location of the light source, wherein the target position corresponds to at least a second pixel position in the at least one image, and wherein the result comprises a pixel position displacement between at least the first pixel position of the light source and at least the second pixel position of the target position.

9. The tracking controller of claim 8, the instructions, when executed, further causing the computer processor to:

send the control signal to the transport robot where the camera device is mounted;

detect an alignment between the target position and the light source within the field-of-view; and cause the camera device to further capture, in response to detecting the alignment, an additional image of the scene, wherein the field-of-view of the camera device is changed, by a movement of the transport robot toward the light source in response to the control signal, in a direction opposite to the pixel position displacement, wherein the alignment corresponds to an overlap between the light source and at least the second pixel position within the field-of-view, and wherein the light source is attached to an object in the scene such that the object overlaps at least the second pixel position in the additional image.

10. The tracking controller of claim 8, wherein the pattern of local light change across the sequence of images is produced by a strobe light emitted from the light source.

11. The tracking controller of claim 8, wherein the pattern of local light change comprises at least one selected from a group consisting of a light intensity change, a light color change, and a combination of light intensity and color change.

12. The tracking controller of claim 8, the instructions, when executed, further causing the computer processor to:

analyze the sequence of images to determine the location of the light source in the at least one image and a movement of the light source across the sequence of images, wherein generating the control signal is further based on the movement.

13. The tracking controller of claim 10, wherein the scene comprises a user at a designated location, wherein the light source is a flash light of a smart phone of the user, wherein the sequence of images and the additional image are part of a sequence of video frames in a video recording captured by the camera device mounted on the transport robot, the instructions, when executed, further causing the computer processor to:

present, using the smart phone, an ordering menu to the user;

receive, by the smart phone, an order specifying at least one item selected by the user from the ordering menu; and activate, by the smart phone in response to receiving the order, the flash light to emit the strobe light, wherein the transport robot delivers, based on the control signal, the at least one item from a source location to the user at the designated location.

14. The tracking controller of claim 13, the instructions, when executed, further causing the computer processor to:

send, by the smart phone to a management server, the order received from the user, wherein the order is among a plurality of orders comprising a plurality of items selected by a plurality of users using a plurality of smart phones;

send, by the transport robot to the management server in response to at least detecting the light source in the scene, a request for delivery instruction;

generate, by the management server based on the plurality of orders, the delivery instruction that specifies a schedule of delivery of the plurality of items to the plurality of users, wherein the transport robot delivering the at least one item from the source location to the user at the designated location is according to the schedule of delivery.

15. A non-transitory computer readable medium storing instructions for object tracking, the instructions, when executed by a computer processor, comprising functionality for:

obtaining a sequence of images of a scene, wherein the sequence of images is captured by a single optical sensor of a camera device;

detecting, based on a pattern of local light change across the sequence of images captured by the single optical sensor, a light source in the scene;

comparing, in response to detecting the light source, a location of the light source in at least one image of the sequence of images and a current position of a transport robot to generate a result; and generating, based on the result, a control signal for moving the transport robot toward the light source such that the light source aligns with a target position within a field-of-view of the camera device, wherein the pattern of local light change identifies at least a first pixel position in the at least one image as the location of the light source, wherein the target position corresponds to at least a second pixel position in the at least one image, and wherein the result comprises a pixel position displacement between at least the first pixel position of the light source and at least the second pixel position of the target position.

16. The non-transitory computer readable medium of claim 15, the instructions, when executed by the computer processor, further comprising functionality for:

sending the control signal to the transport robot where the camera device is mounted;

detecting, in response to sending the control signal, an alignment between the target position and the light source within the field-of-view; and further capturing, using the camera device and in response to detecting the alignment, an additional image of the scene, wherein the field-of-view of the camera device is changed, by a movement of the transport robot toward the light source in response to the control signal, in a direction opposite to the pixel position displacement, wherein the alignment corresponds to an overlap between the light source and at least the second pixel position within the field-of-view, and wherein the light source is attached to an object in the scene such that the object overlaps at least the second pixel position in the additional image.

17. The non-transitory computer readable medium of claim 15, wherein the pattern of local light change across the sequence of images is produced by a strobe light emitted from the light source.

18. The non-transitory computer readable medium of claim 17, wherein the pattern of local light change comprises at least one selected from a group consisting of a light intensity change, a light color change, and a combination of light intensity and color change.

19. The non-transitory computer readable medium of claim 15, the instructions, when executed by the computer processor, further comprising functionality for:

analyzing the sequence of images to determine the location of the light source in the at least one image and a movement of the light source across the sequence of images, wherein generating the control signal is further based on the movement.

20. The non-transitory computer readable medium of claim 17, wherein the scene comprises a user at a designated location, wherein the light source is a flash light of a smart phone of the user, wherein the sequence of images and the additional image are part of a sequence of video frames in a video recording captured by the camera device mounted on the transport robot, the instructions, when executed by the computer processor, further comprising functionality for:

presenting, using the smart phone, an ordering menu to the user;

receiving, by the smart phone, an order specifying at least one item selected by the user from the ordering menu;

activating, by the smart phone in response to receiving the order, the flash light to emit the strobe light;

sending, by the smart phone to a management server, the order received from the user, wherein the order is among a plurality of orders comprising a plurality of items selected by a plurality of users using a plurality of smart phones;

sending, by the transport robot to the management server in response to at least detecting the light source in the scene, a request for delivery instruction; and generating, by the management server based on the plurality of orders, the delivery instruction that specifies a schedule of delivery of the plurality of items to the plurality of users, wherein the transport robot delivers, based on the control signal and according to the schedule of delivery, the at least one item from the source location to the user at the designated location.

* * * * *